Oct. 29, 1940.  I. JUNG  2,219,994
GAS TURBINE PLANT AND REGULATING SYSTEM THEREFOR
Filed Aug. 30, 1938  2 Sheets-Sheet 2
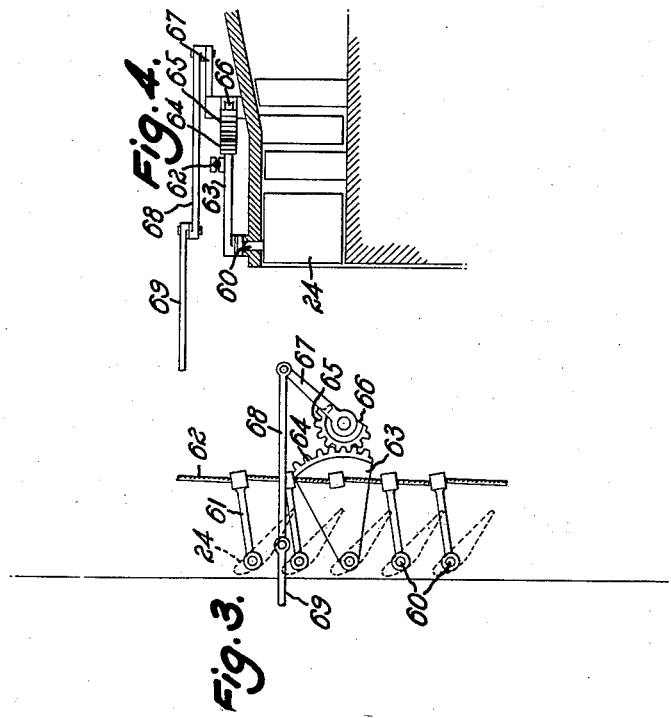
Inventor:
Ingvar Jung,
By Potter, Pierce & Scheffler,
Attorneys.

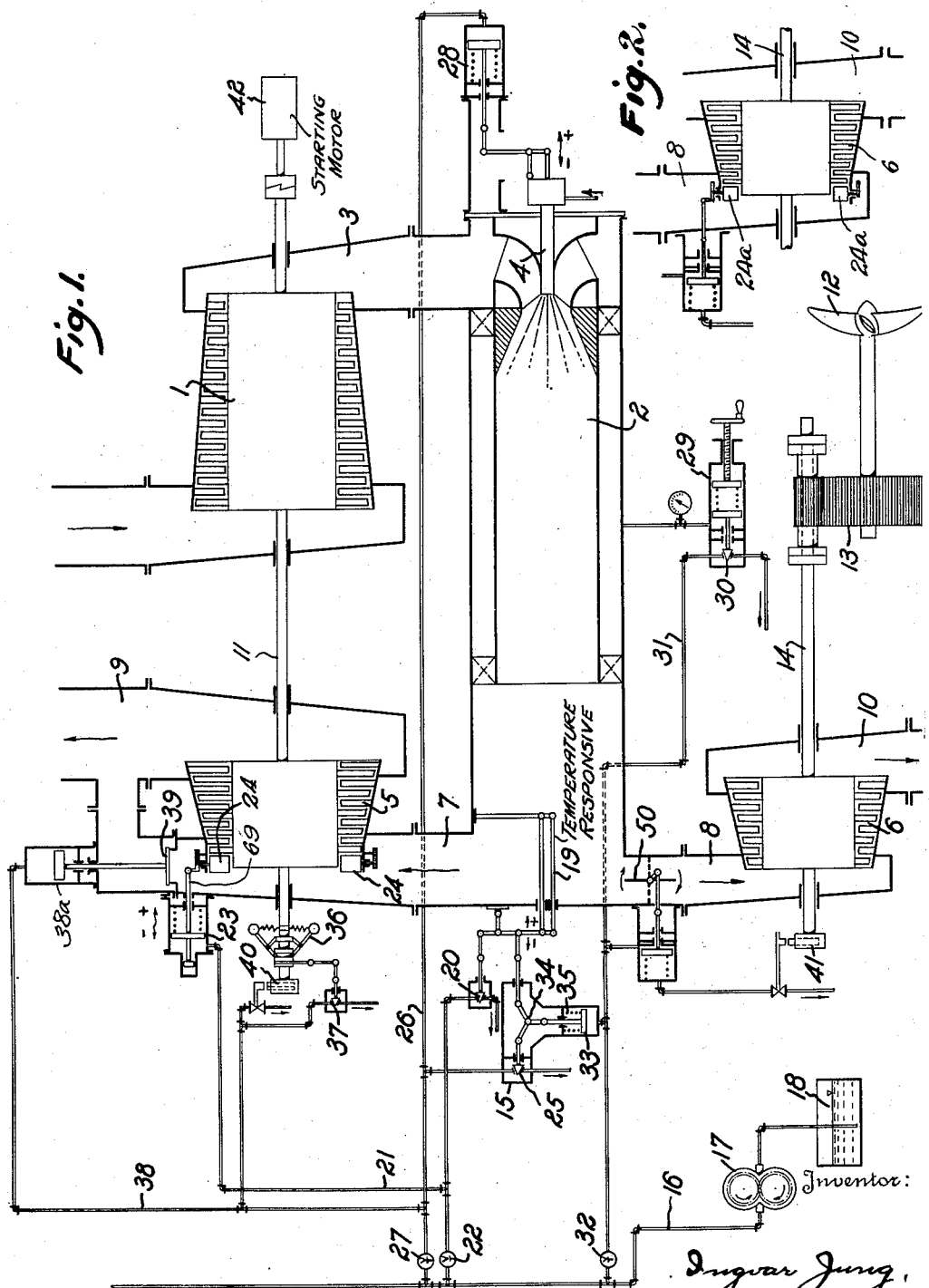

Patented Oct. 29, 1940

2,219,994

UNITED STATES PATENT OFFICE 2,219,994

GAS TURBINE PLANT AND REGULATING SYSTEM THEREFOR

Ingvar Jung, Baden, Switzerland, assignor to Aktiengesellschaft Brown, Boveri & Cie, Baden, Switzerland, a joint-stock company Application August 30, 1938, Serial No. 227,567
In Germany September 24, 1937

14 Claims. (Cl. 60—41)

The present invention relates to regulating systems for gas turbine plants and particularly to gas turbine plants employing one turbine for driving the compressor and another turbine for delivering the useful power. The plant is especially useful for ship propulsion.

It is well known that in uniform pressure or impulse gas turbine plants, in order to obtain the required effective power with a desired turbine speed without excessive losses, two turbines must be employed, one for driving the air compressor and the other for furnishing the useful power output necessary to carry the load on the plant. For purpose of convenience in the following, these turbines will be referred to as the compressor turbine and useful power turbine, respectively.

It is also known to regulate such plants by control of the fuel supply and by controlling the distribution of motive gases between the compressor and useful power turbine.

It is impractical to use any but reaction turbines in such plants because of the high efficiency requirements arising from the fact that the compressor turbine consumes so much power that the useful power output constitutes only a small part of the total power produced by the plant. For this reason, the designer of such a plant has heretofore had to choose between purely throttle regulation and stage bridging. Both of these known types of regulation have serious disadvantages which may be summarized as follows:

1. With purely throttle regulation, the turbine must be designed for maximum gas volume (100% charge). Partial loads are attained by throttling down the initial pressure so that the volumes admitted compare with those for full load. Due to the throttling, the drop in heat and the amount of gas passing through will be smaller. Throttling however, is always accompanied by a great heat drop loss and good efficiency is possible only at full load. Practically all reaction steam turbines are therefore provided with an impulse regulating stage. However, in gas turbines the heat drop is too small to permit the use of an impulse regulating stage without too great a loss in efficiency.

2. Stage bridging is used generally in steam turbine construction at present with true reaction turbines (Ljungstrom turbines). With this method the turbine is designed for partial load and greater amounts of motive fluid are employed by bridging over one or more of the first stages. In this way the consuming capacity is so increased that the amount of motive fluid that is necessary for 100% load can work in the stages not bridged over. The bridged-over stages, however, must run empty and thus exert a considerable braking effect due to ventilation losses.

In turbines in which the heat drop is very small, such as gas turbines, the gas volumes are very large and the cross sections for the gas flow are likewise very large. In gas turbines, regulation by bridging over one or more stages involves great structural difficulties, since the bridging conduits and the inlet and outlets of bridging conduits require an unusual amount of space. From a practical structural standpoint, therefore, stage bridging in gas turbines is impractical.

According to the present invention, the distribution of power between compressor turbine and useful power turbine is regulated by adjustable guide vanes arranged at least in the inlet side of the former.

The advantages of this type of regulation, especially in the case of a reaction gas turbine plant for transportation, for instance plants for ship propulsion or similar requirements, arise from the fact that the turbine, as with throttle regulation is designed for the greatest volumes of gas used at the highest air intake temperature. With loads less than 100%, the adjustable guide vanes act similarly to throttle regulation except that the throttling heat drop is utilized in the guide vanes and there produces a high admission velocity to the rotor vanes. This high admission velocity is utilized with comparatively good efficiency. If the rotor vanes are designed for axial admission of the gases at 100% load, greater admission velocities occur with smaller loads and the gas strikes the rotor vanes with a definite impulse effect. The impulse component appears as an expansion impulse and has been found to be well utilized. For these reasons, the system of regulation according to the invention is far superior to throttle regulation as regards economy and efficiency. Structurally the proposed system is likewise superior to bridging regulation, the use of which is impractical with gas turbines as mentioned above.

The system of regulation according to the invention will be described in greater detail with reference to the accompanying drawings, wherein Fig. 1 shows diagrammatically an illustrative embodiment of a system of power regulation according to the invention, for example for a marine gas turbine plant, Fig. 2 is a fragmentary diagrammatic view showing the application of guide vanes to the useful power turbine, Fig. 3 is a semi-diagrammatic plan view on an enlarged scale showing the guide vanes and manner of operating the same, Fig. 4 is a fragmentary axial section through the operating means of Fig. 3.

In the drawings 1 is an axial flow air compressor which delivers air under compression to a combustion chamber 2 through the passage 3, fuel being supplied to the combustion chamber through an injection nozzle 4. The hot motive gases from the combustion chamber 2 are distributed to a compressor turbine 5 and a useful power turbine 6 through conduits 7 and 8, respectively, leading from the combustion chamber 2. After expansion in the turbines 4 and 5 the gases exhaust through passages 9 and 10 respectively. The compressor turbine 5 drives the compressor 1, the rotor of the latter being directly driven from the rotor shaft 11 of the compressor turbine. The useful power turbine 6 is in driving engagement with a propeller 12 through the medium of transmission gearing 13 connected with the rotor shaft 14 of said useful power turbine.

A regulating means 15, the detailed construction of which will be hereafter described, maintains the motive gas temperature substantially constant and in such condition that the power output of the compressor turbine 5 is equal to the load of the compressor. The motive gas is distributed between the compressor turbine 5 and useful power turbine 6 in such relative amounts that the regulating means 15 is not required to take care of a higher gas temperature, in order to maintain sufficient power for the work of compression, than is suitable for the blade material of the turbines.

In the illustrated embodiment of the invention, fluid pressure is employed for effecting the various control operations. For this purpose a constant pressure is maintained in an oil line 16 by means of a pump 17 drawing oil from a supply 18. The mean temperature of the motive gas acts through a temperature responsive device 19 comprising two rods of different metals which expand and contract to a slightly different extent under the influence of temperature changes, the rods being exposed to the gases from combustion chamber 2 and adapted by expansion and contraction due to the changes in temperature to control a pressure regulating valve 20 which controls oil pressure in a line 21 connected through a throttle 22 to pressure line 16 and leading to an oil servo-motor 23. The servo-motor 23 is connected to turn the guide vanes 24 disposed in the inlet side of the compressor turbine 5 in such a manner that when the motive gas temperature is too high, the vanes are adjusted toward open position and when the gas temperature is too low, the vanes are adjusted toward closed position.

The guide vanes 24 are mounted on radial pivots and are connected for simultaneous operation. When in fully open position, they occupy a position parallel to the axis of the turbine and when in closed position are disposed substantially at right angles to the axis thereof. The guide vanes 24 and turbine 5 are designed for the greatest amount of gas that is used at the highest air inlet temperature. With lower air temperatures, the work of compression will be less and the required amount of gas for the operation of the compressor turbine 5 will likewise be less.

The operating connections for the guide vanes 24 are shown in greater detail in Figs. 3 and 4. The pivot shafts 60 of the vanes 24 each have a crank arm 61 mounted on the outer end thereof, the outer ends of the crank arms being connected to a tensioned cable 62 extending around the turbine casing and connected to a rocking gear segment 63 mounted on the shaft of one of the vanes and having its teeth 64 in mesh with teeth 65 on a pinion 66 which is operated by a crank arm 67 connected by a link 68 to the piston rod 69 of the servo-motor 23.

Since the power of compressor turbine is at first unchanged, the turbine power will exceed the compressor load if the regulator 15 does not reduce the gas temperature. This reduction in motive gas temperature reacts on the guide vanes 24 so that they are closed somewhat as described above. This change in adjustment of the guide vanes results in a decrease in the amount of gas admitted to the turbine 5 and an increase in the heat drop in the guide vanes and the admission velocity of the motive gases to the first row or rotor blades becomes greater due to the angular disposition of the vanes. In the turbine, which is designed for axial admission of the motive gas to the rator vanes with wide open or maximum guide vane adjustment, a so-called expansion impulse occurs in the first row or rotor vanes with smaller amounts of gas and corresponding partially closed guide vane positions. Since the expansion impulse involves comparatively small loss, this regulation with adjustable guide vanes utilizes the heat drop across the guide vanes much better than a throttle regulation and is likewise superior for structural reasons to bridging regulation in gas turbines.

The regulation of motive gas to the useful power turbine 6 may also be desirable and for this purpose a simple type of throttle flap valve 50 may be employed in the conduit 8. The invention also contemplates the use of adjustable guide vanes 24ᵃ in the inlet of the useful power turbine, in place of the throttle valve shown, as shown in Fig. 2.

The useful power of turbine 5 can be adjusted by varying the amount of motive gas supplied or by heat drop regulation. If it is desired to operate with constant heat drop, the pressure and temperature in front of the turbine must be kept constant. This would require practically constant speed of the compressor. At partial load with such an arrangement, the efficiency would be very poor since the compression work would be practically as great as with full load. If the combustion chamber pressure and the speed of the compressor are varied in conformance with variation of the useful power load, the useful power turbine can always be operated at full acceleration without throttling, this being advantageous especially when driving continuous flow machines at variable speeds since the Parsons number remains practically constant independent of the load.

The useful power is therefore primarily dependent on the speed of the compressor and the combustion chamber pressure. In order to increase the speed of the compressor, the output of the compressor turbine must temporarily exceed the compressor load. This temporary increase in output is attained by increasing the motive gas temperature for a short time. Such increase in gas temperature is permissible without danger of damage to the vanes or turbine blades since only the average permanent temperature is important as affecting resistance to creeping and temporary increases in temperature during changes in load have little effect on the strength limits.

The temperature sensitive means 19, mentioned above, is also operatively connected to adjust the amount of fuel in a definite ratio to the amount of air supplied to the combustion chamber. This regulation is effected through control of a pressure regulating valve 25 of the regulator 15 which controls the oil pressure in pipe 26 connected through a throttle 27 to pressure line 16 and leading to the servo-motor 28 which adjusts the fuel supply to the combustion chamber and thereby keeps the gas temperature constant.

An adjustable power regulator 29 which includes a pressure control valve 30 controls the oil pressure in pipe 31 which is connected through throttle 32 to pressure line 16. The pressure in pipe 31 acts on an adjusting plunger 33 in the regulator 15. The adjusting plunger 33 is connected to a toggle link 34 between the valve 25 and temperature sensitive means 19. By increasing the pressure in line 31 upon a closing movement of the valve 30, the plunger 33 is shifted against the pressure of spring 35 to straighten the toggle 34 and give a closing movement to the valve 25, thus increasing the pressure in line 26 and operating the servo-motor 28 to increase the fuel supply. Thus, by means of adjustment of the power regulator 29, the fuel supply and thereby the gas temperature can be increased or decreased temporarily.

The alteration of the motive gas temperature results in a change in speed of the air compressor, and thus a change in pressure which effects a corresponding change in useful power output. The distribution of power between compressor turbine and useful power turbine through the medium of means 19, 20 and 28 therefore insures that the power output of the compressor turbine will always be equivalent to the compression load independently of the intake temperature, at a definite average temperature that can be adjusted by the regulator 20.

The power regulator 29 controls the speed of the compressor and the combustion chamber pressure, through the regulating means 30, 33, 25 and 28, by effecting temporary variation of the motive gas temperature, and thereby regulates the useful power output.

A speed governor 36 is mounted on the compressor turbine shaft 11 and through regulating valve 37 controls the pressure in oil line 38 which is connected to a servo-motor 38a, the piston of which under pressure of the oil in line 38 normally holds a bypass valve 39 closed against the pressure of the motive gases. The regulating valve 37 is opened by the governor, thus relieving the pressure in the oil line 38 and servo-motor 38a, allowing the valve 39 to open so that a portion of the hot motive gases are by-passed around the turbine 5 to exhaust conduit 9 if the compressor speed becomes excessive. Disengaging devices of ordinary construction are indicated at 40 and 41. A starting motor 42 adapted to be connected to the shaft 11 of the compressor turbine is provided for driving compressor 1 and turbine 5 when starting the system into operation.

In the operation of the system as described above, the regulator 29 being set for the power output desired, the motor 42 is connected to start the plant in operation. As the motive gas temperature rises the temperature sensitive device 19 actuates the regulator 15 to regulate the fuel supply and at the same time the rise in temperature results in opening the guide vanes 24 to a position at which the turbine 5 will deliver sufficient power to drive the air compressor at a speed in conformance with the fuel supply adjustment to furnish the power output for which the power regulator has been set.

When it is desired to increase the output of the useful power turbine 6, power regulator 29 is adjusted to increase the pressure on the spring which balances against the pressure in the combustion chamber and thus closes the valve 30 and through the resultant increase of pressure on the plunger 33 actuates the regulator 15 to increase the fuel supply. The increase in fuel supply in relation to the volume of air being delivered by the compressor results in an increase in temperature in the combustion chamber and motive gases which reacts on the temperature responsive device 19 to further open the guide vanes 24 and thus increase the amount of motive gas admitted to the compressor turbine. The resultant increase in compressor-turbine speed increases the compressor output to bring it up to the amount necessary to meet the demands of the increased fuel supply. As soon as the correct ratio between fuel supply and combustion air is again attained and the pressure in the combustion chamber increases to the desired amount, the combustion chamber pressure will again balance the spring and the pressure in line 31 on plunger 33 will be adjusted by opening of valve 30. Thus the abnormal temporary temperature rise will be abated and the guide vanes 24 will be adjusted to a position to cause the power output of the compressor turbine to equal the load demand of the compressor.

The reverse of the last described operation occurs upon operation of the power regulator 29 for securing a lower power output.

While a preferred illustrative embodiment of the invention has been shown and described, it is to be understood that various modifications in the details of construction and mode of operation may be resorted to without departing from the spirit of the invention within the definition of the appended claims.

I claim:

1. In a gas turbine system of the continuous combustion type including a compressor turbine and a useful power turbine arranged in parallel as to the flow of motive fluid therethrough, a combustion chamber, a compressor driven by said compressor turbine for supplying air to said combustion chamber and conduits connecting the combustion chamber to said turbines; means for regulating the distribution of motive gases between said compressor turbine and said useful power turbine comprising adjustable guide vanes in the inlet side of the compressor turbine.

2. In a gas turbine system of the continuous combustion type including a compressor turbine and a useful power turbine arranged in parallel as to the flow of motive fluid therethrough, a combustion chamber, a compressor driven by said compressor turbine for supplying air to said combustion chamber and conduits connecting the combustion chamber to said turbines; means for regulating the distribution of motive gases between said compressor turbine and said useful power turbine comprising adjustable guide vanes in the inlet side of each of said turbines.

3. In a gas turbine system of the continuous combustion type including a compressor turbine and a useful power turbine arranged in parallel as to the flow of motive fluid therethrough, a combustion chamber, a compressor driven by said compressor turbine for supplying air to said combustion chamber and conduits connecting the combustion chamber to said turbines; means for regulating the distribution of motive gases between said compressor turbine and said useful power turbine comprising adjustable guide vanes in the inlet side of the compressor turbine, and means responsive to the temperature of the motive gases leaving said combustion chamber for adjusting the position of said guide vanes.

4. In a gas turbine system of the continuous combustion type including a compressor turbine and a useful power turbine arranged in parallel as to the flow of motive fluid therethrough, a combustion chamber, a compressor driven by said compressor turbine for supplying air to said combustion chamber and conduits connecting the combustion chamber to said turbines; means for regulating the distribution of motive gases between said compressor turbine and said useful power turbine comprising adjustable guide vanes in the inlet side of each of said turbines, and means responsive to the temperature of the motive gases leaving said combustion chamber for adjusting the position of said guide vanes.

5. In a gas turbine system of the continuous combustion type including a compressor turbine and a useful power turbine arranged in parallel as to the flow of motive fluid therethrough, a combustion chamber, a compressor driven by said compressor turbine for supplying air to said combustion chamber and conduits connecting the combustion chamber to said turbines; means for regulating the distribution of motive gases between said compressor turbine and said useful power turbine comprising adjustable guide vanes in the inlet side of the compressor turbine, means responsive to the motive gas temperature in said combustion chamber for opening said guide vanes upon an increase in temperature of said gases and for closing said guide vanes upon a decrease in temperature of said gases.

6. In a gas turbine system of the continuous combustion type including a compressor turbine and a useful power turbine arranged in parallel as to the flow of motive fluid therethrough, a combustion chamber, a compressor driven by said compressor turbine for supplying air to said combustion chamber and conduits connecting the combustion chamber to said turbines; means for regulating the distribution of motive gases between said compressor turbine and said useful power turbine comprising adjustable guide vanes in the inlet side of the compressor turbine, and means responsive to the motive gas temperature for regulating the fuel supply to said combustion chamber.

7. In a uniform pressure gas turbine plant including a useful power turbine, a compressor turbine, a compressor driven by said compressor turbine, a combustion chamber receiving combustion air from said compressor, said turbines being arranged in parallel as to the flow of motive fluid therethrough, adjustable means supplying fuel to said combustion chamber for burning with compressed air from said compressor to supply motive gas for driving said turbines, a plurality of radially pivoted adjustable guide vanes at the inlet side of said compressor turbine disposed adjacent to the first row of blades of said turbine for regulating the distribution of motive fluid between said turbines.

8. In a uniform pressure gas turbine plant including a useful power turbine, a compressor turbine, a compressor driven by said compressor turbine, a combustion chamber receiving combustion air from said compressor, said turbines being arranged in parallel as to the flow of motive fluid therethrough, adjustable means supplying fuel to said combustion chamber for burning with compressed air from said compressor to supply motive gas for driving said turbines, a plurality of radially pivoted adjustable guide vanes at the inlet side of said compressor turbine disposed adjacent to the first row of blades of said turbine for regulating the distribution of motive fluid between said turbines, means responsive to the temperature of said motive gas for adjusting the angular position of said guide vanes with respect to the axis of said compressor turbine.

9. In a uniform pressure gas turbine plant including a useful power turbine, a compressor turbine, a compressor driven by said compressor turbine, a combustion chamber receiving combustion air from said compressor, said turbines being arranged in parallel as to the flow of motive fluid therethrough, adjustable means supplying fuel to said combustion chamber for burning with compressed air from said compressor to supply motive gas for driving said turbines, a plurality of radially pivoted adjustable guide vanes at the inlet side of said compressor turbine disposed adjacent to the first row of blades of said turbine for regulating the distribution of motive fluid between said turbines, means responsive to the temperature of said motive gas for adjusting the angular position of said guide vanes with respect to the axis of said compressor turbine and means responsive to the temperature of said motive gases for adjusting the fuel supply to said combustion chamber to maintain the motive gas temperature at the highest value permissible for the blade material of said turbines.

10. In a uniform pressure gas turbine plant including a useful power turbine, a compressor turbine, a compressor driven by said compressor turbine, a combustion chamber receiving combustion air from said compressor, said turbines being arranged in parallel as to the flow of motive fluid therethrough, adjustable means supplying fuel to said combustion chamber for burning with compressed air from said compressor to supply motive gas for driving said turbines, a plurality of radially pivoted adjustable guide vanes at the inlet side of said compressor turbine disposed adjacent to the first row of blades of said turbine for regulating the distribution of motive fluid between said turbines, means responsive to the temperature of said motive gas for adjusting the angular position of said guide vanes with respect to the axis of said compressor turbine, means responsive to the temperature of said motive gases for adjusting the fuel supply to said combustion chamber to maintain the motive gas temperature at the highest value permissible for the blade material of said turbines, and means for regulating the useful power output by increase or reduction of the temperature of said motive gas independently of said temperature responsive fuel control means.

11. In a uniform pressure gas turbine plant including a useful power turbine, a compressor turbine, a compressor driven by said compressor turbine, a combustion chamber supplied with compressed air from said compressor, said turbines being arranged in parallel as to the flow of motive fluid therethrough, adjustable means for supplying fuel to said combustion chamber for burning with said air to form motive gas for driving said turbines, and a plurality of radially pivoted guide vanes disposed adjacent the first row of rotor blades at the inlet side of each of said turbines for regulating the distribution of motive gases between said turbines.

12. In a uniform pressure gas turbine plant including a useful power turbine, a compressor turbine, a compressor driven by said compressor turbine, a combustion chamber supplied with compressed air from said compressor, said turbines being arranged in parallel as to the flow of motive fluid therethrough, adjustable means for supplying fuel to said combustion chamber for burning with said air to form motive gas for driving said turbines, a plurality of radially pivoted guide vanes disposed adjacent the first row of rotor blades at the inlet side of said compressor turbine, and means responsive to the temperature of said motive gas for adjusting said guide vanes between a wide open position parallel to the axis of said compressor turbine and a closed position at substantially right angles to said axis for regulating the distribution of motive gases between said turbines, said temperature responsive means reacting to regulate said guide vanes toward open position in response to increase in motive gas temperature and to regulate said vanes toward closed position in response to decrease in motive gas temperature.

13. In a uniform pressure gas turbine plant including a useful power turbine, a compressor turbine, a compressor driven by said compressor turbine, a combustion chamber supplied with compressed air from said compressor, said turbines being arranged in parallel as to the flow of motive fluid therethrough, adjustable means for supplying fuel to said combustion chamber for burning with said air to form motive gas for driving said turbines, a plurality of radially pivoted guide vanes disposed adjacent the first row of rotor blades at the inlet side of said compressor turbine, and means responsive to the temperature of said motive gas for adjusting said guide vanes between a wide open position parallel to the axis of said compressor turbine and a closed position at substantially right angles to said axis for regulating the distribution of motive gases between said turbines, said temperature responsive means reacting to regulate said guide vanes toward open position in response to increase in motive gas temperature and to regulate said vanes toward closed position in response to decrease in motive gas temperature, and means responsive to said motive gas temperature for regulating the supply of fuel to said combustion chamber, said guide vane adjusting means and said fuel supply regulating means coacting to maintain a motive gas temperature at the highest value permitted by the blade material of said turbines.

14. In a uniform pressure gas turbine plant including a useful power turbine, a compressor turbine, a compressor driven by said compressor turbine, a combustion chamber supplied with compressed air from said compressor, said turbines being arranged in parallel as to the flow of motive fluid therethrough, adjustable means for supplying fuel to said combustion chamber for burning with said air to form motive gas for driving said turbines, a plurality of radially pivoted guide vanes disposed adjacent the first row of rotor blades at the inlet side of said compressor turbine, and means responsive to the temperature of said motive gas for adjusting said guide vanes between a wide open position parallel to the axis of said compressor turbine and a closed position at substantially right angles to said axis for regulating the distribution of motive gases between said turbines, said temperature responsive means reacting to regulate said guide vanes toward open position in response to increase in motive gas temperature and to regulate said vanes toward closed position in response to decrease in motive gas temperature, means responsive to said motive gas temperature for regulating the supply of fuel to said combustion chamber, said guide vane adjusting means and said fuel supply regulating means coacting to maintain a motive gas temperature at the highest value permitted by the blade material of said turbines, and means for regulating the useful power output of said plant by increase or reduction of motive gas temperature supplemental to said temperature responsive fuel supply regulating means.

INGVAR JUNG.